(12) United States Patent
Yatskan (10) Patent No.: US 11,366,225 B2
(45) Date of Patent: Jun. 21, 2022

(54) ACTIVE-PIXEL SENSOR ARRAY (71) Applicant: NewSight Imaging Ltd., Ness Ziona (IL)

(72) Inventor: Eyal Yatskan, Modiin (IL)

( * ) Notice: Subject to any disclaimer, the term of this patent is extended or adjusted under 35 U.S.C. 154(b) by 759 days.

(21) Appl. No.: 16/236,661

(22) Filed: Dec. 31, 2018

(65) Prior Publication Data

US 2019/0235080 A1 Aug. 1, 2019

Related U.S. Application Data

(60) Provisional application No. 62/611,553, filed on Dec. 29, 2017.

(51) Int. Cl.
*G01S 17/10* (2020.01)
*G01S 7/48* (2006.01)
*H04N 5/347* (2011.01)
*H04N 5/378* (2011.01)
*G01S 7/4863* (2020.01)

(52) U.S. Cl.
CPC ............ *G01S 17/10* (2013.01); *G01S 7/4863* (2013.01); *H04N 5/347* (2013.01); *H04N 5/378* (2013.01)

(58) Field of Classification Search
CPC ........ G01S 17/10; G01S 7/4863; G01S 17/42; H04N 5/347; H04N 5/378
See application file for complete search history.

(56) References Cited

U.S. PATENT DOCUMENTS 10,768,301 B2 * 9/2020 Geuens ................. G01S 7/4863
11,204,421 B2 * 12/2021 Inoue .................... G01S 7/4865

* cited by examiner

*Primary Examiner* — Seung C Sohn
(74) *Attorney, Agent, or Firm* — Patshegen IP; Moshe Pinchas (57) ABSTRACT

A range detector for detecting distance of an object is provided. The detector includes: a light source configured to emit a first light pulse and a second light pulse towards a distant object, the first light pulse being configured for short-range object detection and the second light pulse being configured for long-range object detection; an active pixel sensor having a plurality of pixel elements each of which including at least one photodiode and at least one floating diffusion region configured to receive photoelectric charge from the at least one photodiode, the at least one photodiode being disposed with respect to the light source, such that the first and second pulses are reflected back from the object towards the at least one photodiode; and a controller configured to actuate the light source to selectively emit the first and second light pulses and to determine distance of the object.

17 Claims, 4 Drawing Sheets

ACTIVE-PIXEL SENSOR ARRAY

FIELD OF INVENTION

The presently disclosed subject matter relates to an active-pixel sensor array, in general, and in particular to an active-pixel sensor array for an image having a high resolution in one of the dimensions thereof.

BACKGROUND

Active-pixel sensors (APS) include an array of pixel sensors, each pixel containing a photodetector, implanting various technologies such as CMOS, CCD, etc.

In general, it is desired to improve the pixel sensitivity, such that each pixel can generate a sufficient amount of electrons in response to photon strikes on the active surface of the pixel. Thus, increasing the active area of each pixel sensor results in an enhanced sensitivity of the pixel. In some applications, the electrons generated by each pixel are utilized to form a single pixel in a detected image, increasing the area of each pixel requires to either reduce the number of pixels in one of the dimensions of the detected image, or to increase the size of the entire active-pixel sensors. While reducing the number of pixels in the detected image directly reduces the resolution of the image, increasing the size of the array of pixel sensors, requires changing the physical dimensions of the detector.

In some applications, it is required that the pixel array includes a large number of pixels in one dimension of the array (for example 2048), while fewer pixels in the other dimension of the array. Such an array, which provides an image having a high resolution in one of the dimensions thereof, is commonly utilized in line scanners and laser LIDARs.

Figure 1A:
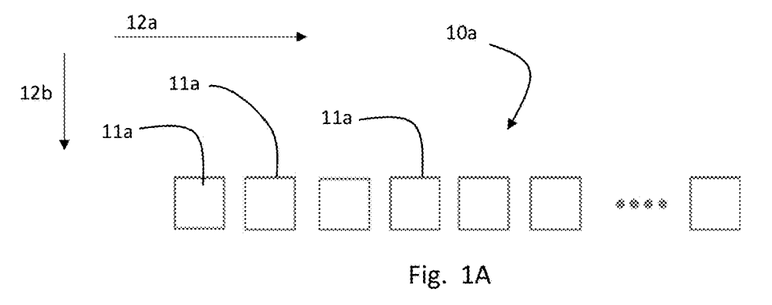
FIG. 1A is a prior art array of pixel sensors in accordance with a first example.
Figure 1B:
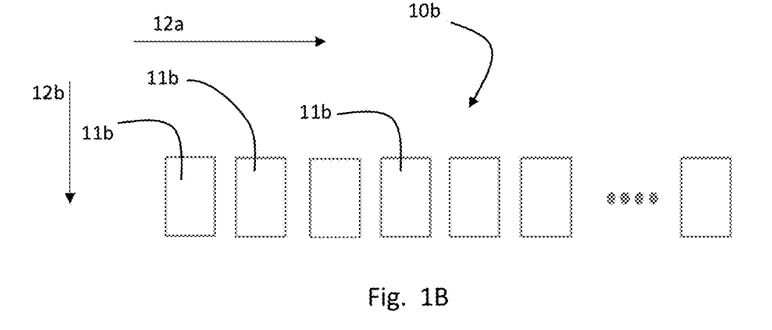
FIG. 1B is a prior art array of pixel sensors in accordance with a second example.

Accordingly, as shown in FIGS. 1A and 1B, for these applications, it is possible to arrange the photodiodes 11a on the array 10a along a first dimension 12a (FIG. 1A). In order to increase the sensitivity of each pixel the active region of each pixel sensor 11b can be expanded in a second dimension 12b (FIG. 1B). This way the sensitivity of each pixel sensor is increased, while maintaining the resolution of the entire array along the first dimension.

Increasing the dimension of each pixel sensor 11b in the second dimension 12b, is however limited to a certain dimension by the semiconductor technology, due to technical difficulties related to the readout of pixels, i.e. the so-called diffusion length of charge carriers in a semiconductor.

Figure 2:
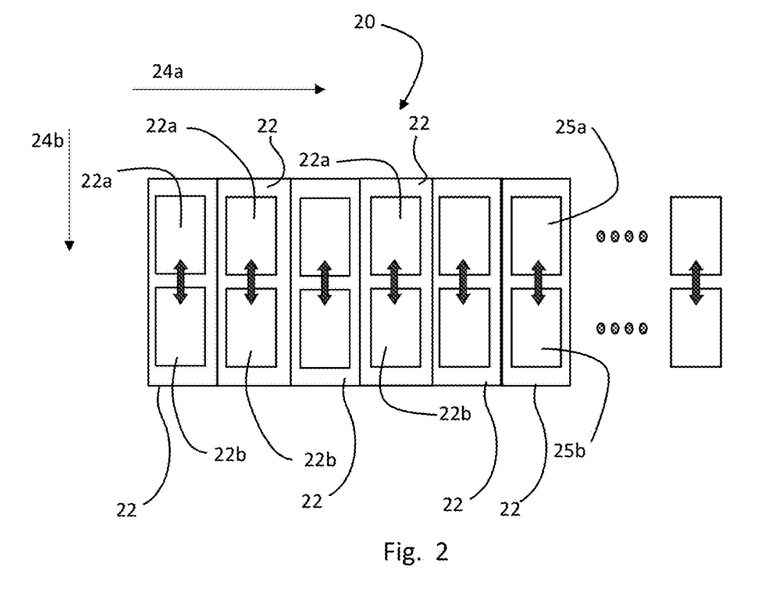
FIG. 2 is a prior art array of pixel sensors in accordance with another example.

As shown in FIG. 2, one known solution for increasing the sensitivity of each pixel sensor is binning technology. A pixel array 20 can include a large number of photodiodes 22 disposed along one-dimension 24a thereof. Each pixel sensor 22 includes an active region which is increased along a second dimension 24b of the array, as in the array 10b of FIG. 1b. In addition, the photodiodes 22 in the pixel array 20 are arranged in a first row 25a and a second row 25b. The first and second row are extended along the first dimension, and are disposed with respect to one another along the second dimension 24b. Each one of the pixels in the first row 25a is coupled to the corresponding pixels of the second row 25b such that the two coupled photodiodes 22a and 22b are configured for binning operation and the readout of the two coupled photodiodes 22a and 22b is carried out through a common floating diffusion region (not shown). This way, the active region of each pixel sensor is the sum of the active region of the two adjacent pixels sensors 22a and 22b in the first row 25a and the second row 25b, respectively. The arrangement of the photodiodes in two adjacent rows thus allows increasing the sensitivity of the array however without compromising on the resolution of the image obtained by the number of pixel along the first dimension of the array 20.

Figure 3:
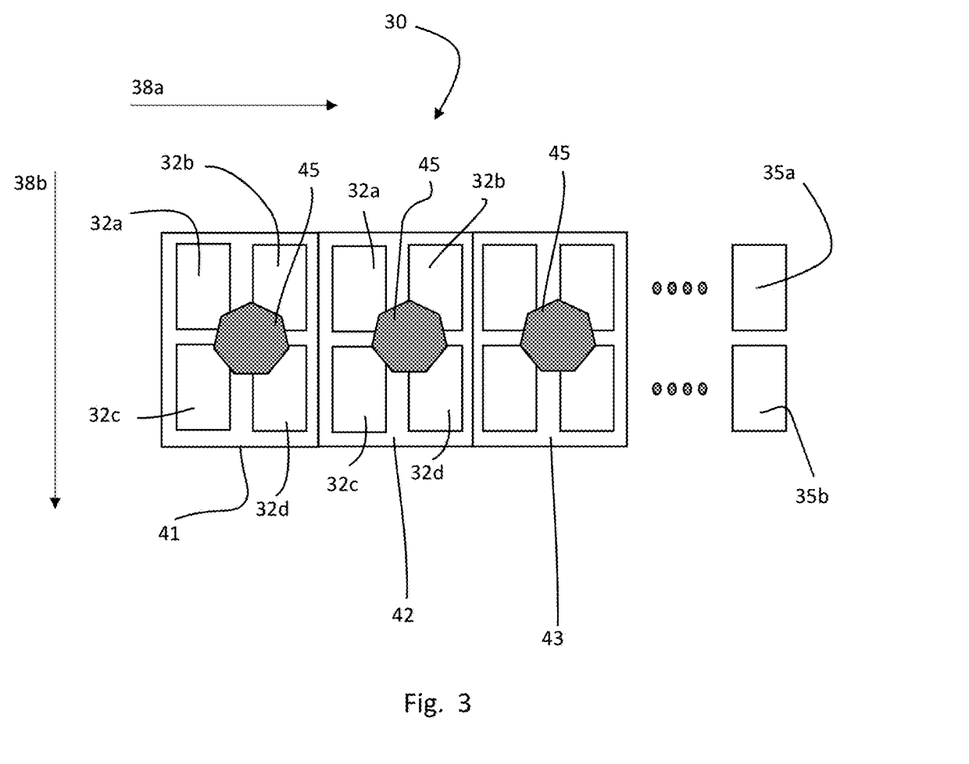
FIG. 3 is a prior art array of pixel sensors in accordance with yet a further example.

As shown in FIG. 3, grouping of photodiodes in a pixel array 30 can be carried out by grouping four adjacent photodiodes 32a, 32b, 32c, and 32d to pixel sensors 41, 42, 43, etc., disposed along a first dimension 38a of the pixel array 30.

The pixel array 30 includes two rows 35a and 35b, such that pixel sensors 41, 42, 43, etc., include two photodiodes on the first row 35a and two photodiodes on the second row 35b. Each of the pixel sensors 41, 42, 43, etc. includes a floating diffusion region 45 configured to allow a common readout of all the photodiodes 32a, 32b, 32c, and 32d in each of the sensor pixels. It is appreciated that the resolution of the array 30 of this example is lower than that of array 20 of FIG. 2, this is due to the fact that each sensor pixel includes two columns of photodiodes and that the columns are arranged along the same dimension as the dimension along which the array is arranged, i.e. the first dimension 38a. In other words, if the number of photodiodes along the first dimension 38a is limited, for example, due to space or structural constrains, the resolution of the array will be compromised, if each pixel sensor includes two photodiodes along the first dimension 38a. Alternatively, the array must include double the number of photodiodes along the first dimension of the array.

The pixel arrays of the above examples can be utilized in many detector applications, such as Light Detection and Ranging systems (LiDAR) which are used in autonomous vehicles for assessing distances. In the LiDAR systems a target is illuminated with a pulsed laser light, and the reflected pulse is measured.

Figure 4:
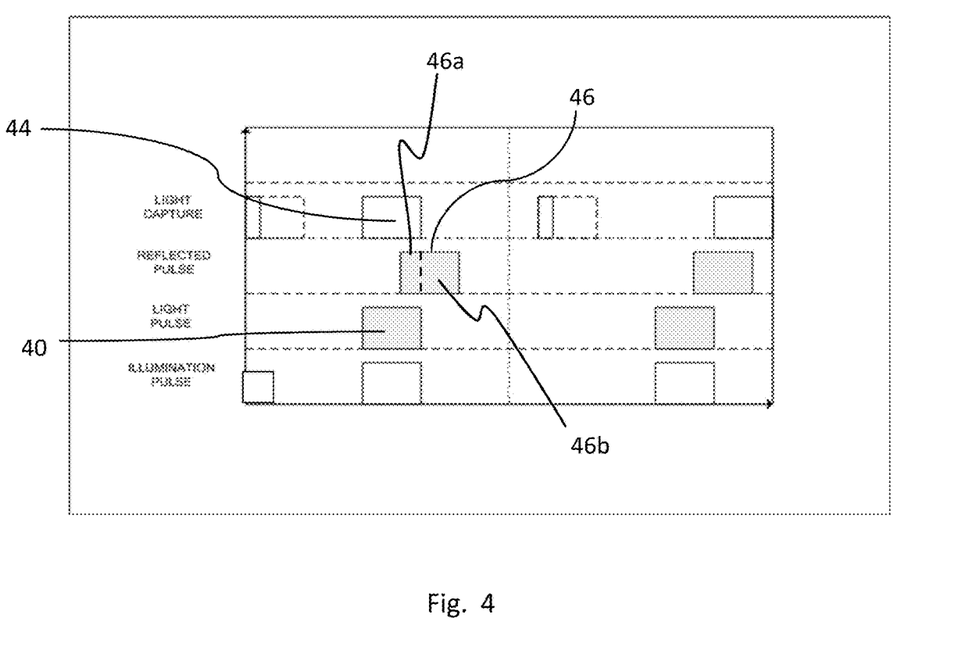
FIG. 4 is a is a graph illustration of the prior art time-of-flight reflected light detection.

As shown in FIG. 4, The LiDAR system is configured to send out light pulse, having a pulse time slot 40 such as a 50 nm pulse, the readout of the detector is carried out at the end of the 50 nm pulse time slot 40. In addition, the detector can be configured to control the exposure time of the detector, for example by using a shutter. This way, the detector can be configured to allow capturing light within a capturing time slot 14, which can be synchronized with the pulse time slot 40, such that the pulse is sent and at the very same time the detector is available to capture the light reflecting from distance objects.

Due to the time of flight of the pulse, however, the reflected pulse 46 reaches the detector with a delay with respect to the pulse time slot 40 and capturing time slot 44. Consequently, only a front section 46a of the reflected pulse 46 reaches the detector, before the end of the capturing time slot 44, and the back section 46b of the reflected pulse 46, is not read by the detector, or at least is not read within the capturing time slot 44.

Accordingly, the distance can be calculated using the equation, $$D = \frac{1}{2} c \; t_0 \frac{S_2}{S_1 + S_2}$$

for an ideal detector. Where c is the speed of light; $t_0$ is the pulse width; i.e. the pulse duration; $S_1$ is the amount of the light of the front section 46a of the reflected pulse 46, i.e. the amount of light which is received by the detector at the pulse timeslot 40, and capturing time slot 44; and S₂ is the amount of the light within the back section 46b of the reflected pulse 46, i.e. the amount of light which is not read by the detector, or at least is not read within the capturing time slot 64.

The above distance calculating equation requires however also the S₂ component of the reflected pulse 46, i.e. the back portion 46b of the light pulse which did not reach the detector within the pulse timeslot 40 and the capturing time slot 44. Thus, following the initial readout of the detector at the end of the pulse timeslot, a second readout can be carried out after a predetermined time period, i.e. timeslot which can be 50 nm time slot, following the end of the capturing time slot 44. The second readout provides the data related to the back portion 46b of the light pulse, i.e. the portion of the light which did not make it to the detector during the 50 nm time slot. This way, the two readouts provide both components of the reflected pulse 46 S₁ and S₂, and the distance of the object can be calculated with the above equation.

Since the above calculation, depends on accurate detection of light reflected from the pulse sent by the laser, the detector can include an array of pixels such as illustrated in one of the examples of FIGS. 1-3, such that the sensitivity of each pixel in the array is increased while the resolution of the entire array is maintained. It is in particular important to maintain the sensitivity of the array when the vehicle autonomy systems relies on the ability to detect objects at various distances with respect to the vehicle, to determine the distance between the vehicle and the object, and to identify the objects such as identifying pedestrians and cyclists, motor vehicles, side strips, bridge abutments, and road margins, etc.

SUMMARY OF INVENTION

There is provided in accordance with an aspect of the presently disclosed subject matter a range detector for detecting distance of an object including: a light source configured to emit a first light pulse and a second light pulse towards a distant object, the first light pulse being configured for short-range object detection and the second light pulse being configured for long-range object detection; an active pixel sensor having a plurality of pixel elements each of which including at least one photodiode and at least one floating diffusion region configured to receive photoelectric charge from the at least one photodiode, the at least one photodiode being disposed with respect to the light source, such that the first and second pulses are reflected back from the object towards the at least one photodiode; and a controller configured to actuate the light source to selectively emit the first and second light pulses and to determine distance between the object and the active pixel sensor in accordance with photoelectric charge received from the photodiode in response to the first and second light pulses.

The controller can be configured to select between the first and second light pulses in accordance with detection and accuracy requirements.

The controller can be configured to alternately select between the first and second light pulses in predetermined pattern.

The controller can be configured to assess results of detection of an initial light pulse and to determine successive pulse by selecting between the first and second light pulses in accordance with the results.

The initial light pulse can be a short-range pulse and wherein the controller can be configured to select the second light pulse wherein the results indicate that no object is located in the short-range.

The readout time of the floating diffusion region can be synchronized with a time duration of one of the first and second light pulses such that the photodiode detects short-range objects during time duration of the first pulse and detects long-range objects during time duration of the second pulse.

The photodiode can include at least one first photodiode and at least one second photodiode and wherein the at least one floating diffusion region includes a first floating diffusion region configured to receive photoelectric charge from the first photodiode and a second floating diffusion region configured to receive photoelectric charge from the second photodiode.

The controller can be configured to determine distance of a long-range object in accordance with photoelectric charge received from the first photodiode in response to the first light pulse and to determine distance of a short-range object in accordance with photoelectric charge received from the second photodiode in response to the second light pulse. Each the at least one first photodiode can include at least two first photodiodes configured for readout by sad first floating diffusion region, and wherein the at least one second photodiode includes one second photodiode, such that an amount of charges received in the at least two first photodiodes is larger than an amount of charges received in the second photodiode.

There is provided in accordance with an aspect of the presently disclosed subject matter an array of pixel elements arranged in columns along a first dimension of the array. Each of the pixel elements includes at least one first photodiode and at least one second photodiode, the first and second photodiodes having an active area for receiving light radiation; a first floating diffusion region configured to receive photoelectric charge generated in the active area of the first photodiode and a second floating diffusion region configured to receive photoelectric charge generated in the active area of the second photodiode; wherein active area of the second photodiode is larger than active area of the first photodiode.

The at least one first photodiode can include at least two photodiodes and wherein the at least one second photodiode includes one second photodiode.

The array can include at least a first row and a second row of photodiodes and wherein at least one first photodiode includes one first photodiode disposed on the first row and two first photodiodes disposed on the second row, and wherein the at least one second photodiode includes one second photodiode disposed on the first row.

The total active area of the first photodiodes is larger than the active area of the one second photodiode, such that sensitivity of each pixel with respect to light detected by the first photodiode is higher than sensitivity of same pixel with respect to light detected by the second photodiode.

The first floating diffusion region can be configured for readout of the first photodiode at a first frequency and wherein the second floating diffusion region is configured for readout of the second photodiode at a second frequency, and wherein the first and second frequencies are configured such that the first photodiode detects a first light signal and the second photodiode detects a second light signal.

The second photodiode can be coupled to the second floating diffusion region and wherein the two photodiodes includes a selectable photodiode which is selectively coupled to the first floating diffusion region and second floating diffusion region. The selectable photodiode includes a switching element for selecting between the first and second floating diffusion regions.

The array can further include a controller for controlling the switching elements, wherein the controller is configured to configure the switching elements to couple the selectable photodiode to the second floating diffusion region in response to a low readout of the second floating diffusion region increasing thereby an active area of photodiodes coupled to the second floating diffusion region.

BRIEF DESCRIPTION OF THE DRAWINGS

In order to understand the disclosure and to see how it may be carried out in practice, embodiments will now be described, by way of non-limiting examples only, with reference to the accompanying drawings, in which.

DETAILED DESCRIPTION OF EMBODIMENTS

Figure 5:
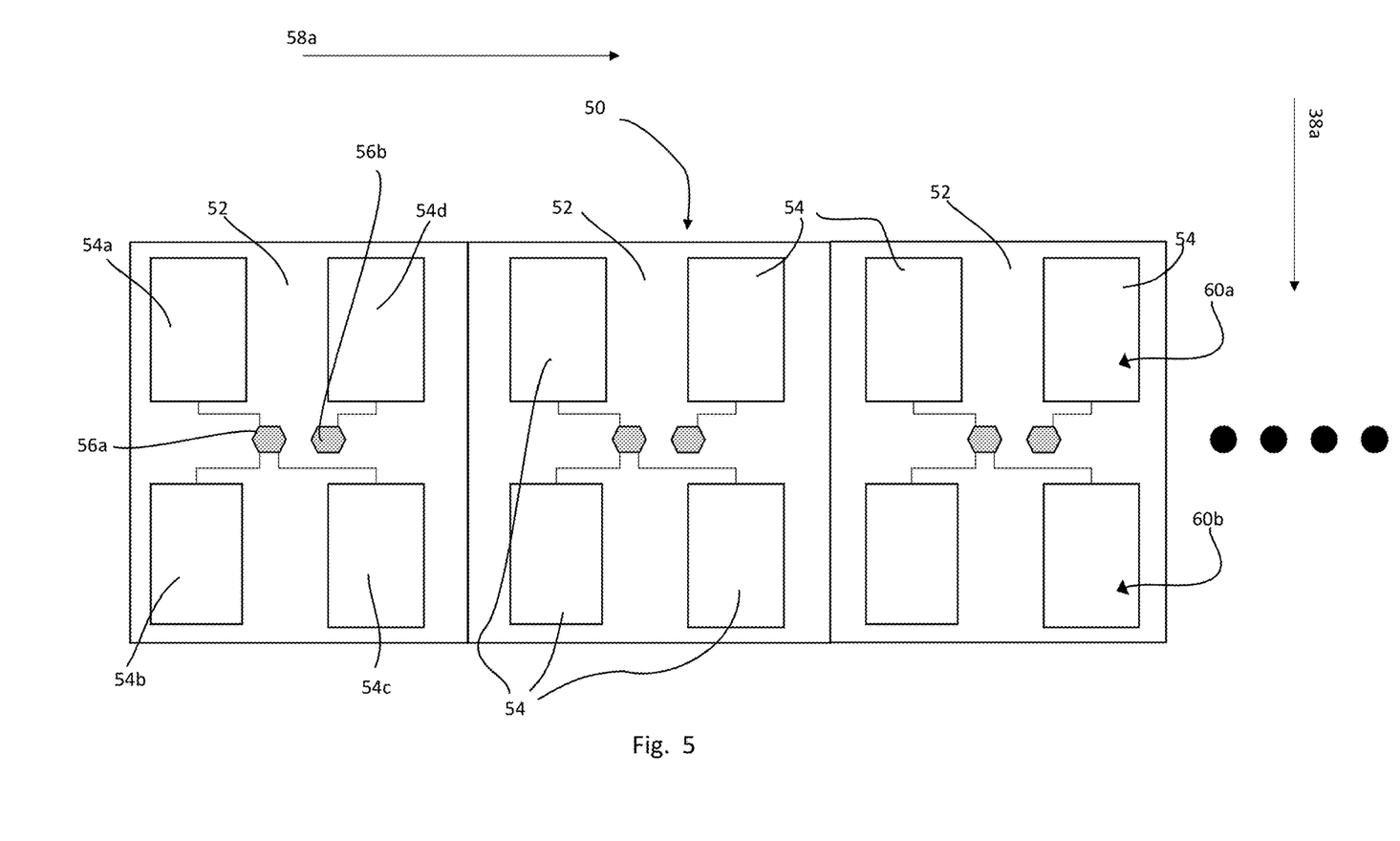
FIG. 5 is a schematic illustration of an array of pixel sensors constructed and operative in accordance with an example of the presently disclosed subject matter.

FIG. 5 shows an array 50 of pixel sensor 52 arranged in columns along a first dimension 58a and configured with high resolution in the first-dimension. The array 50, according to the illustrated example, includes two rows 60a and 60b of photodiodes, generally designated 54. Each pixel sensor 52 is arranged on the two rows 60a and 60b such that it includes four photodiodes 54, two of which disposed on the first row 60a, here designated as photodiodes 54a and 54d, and two of which are disposed on the second row 60b, here designated as photodiodes 54b and 54c. Each of the pixel sensors 52 includes a first floating diffusion region 56a configured to receive photoelectric charge from the photodiodes 54a, 54b and 54c of the pixel sensors 52. In addition, each of the pixel sensors 52 includes a second floating diffusion region 56b configured to receive photoelectric charge from the photodiode 54d. For the sake of clarity, the photodiodes 54a, 54b and 54c which are coupled to the first floating diffusion region 56a are indicated herein as first photodiodes, while second photodiode 54d which is coupled to the second floating diffusion region 56b is indicated herein as second photodiodes.

Thus, according to the illustrated example, the first floating diffusion region 56a is coupled to three first photodiodes namely; photodiodes 54a, 54b and 54c. Due to the symmetric arrangement of the array 50 with respect to the columns and rows, while one first photodiode 54a is disposed on the first row 60a, the other two first photodiodes 54b and 54c are disposed on the second row 60b. In addition, the second floating diffusion region 56b is coupled to the second photodiodes 54b which is disposed on the first row 60a, on the same column as first photodiode 54c.

It should be appreciated that in case of an array which is arranged with another photodiode arrangement, the disposition of the first photodiodes and the second photodiode of each pixel can be different than the quad array of array 50. That is to say, the array can include a plurality of pixels arranged along a first dimension in a triangular arrangement. I.e. each pixel can include two first photodiodes coupled to a first floating diffusion region and one second photodiode coupled to a second floating diffusion region.

Referring back to the example of FIG. 5, the array 50 can thus be utilized in a detector configured to detect two signals simultaneously. I.e. a first signal can be detected by the three first photodiodes 54a, 54b and 54c and the first floating diffusion region 56a coupled thereto. A second signal can be detected by the single second photodiode 54d and the second floating diffusion region 56a coupled thereto. Since the number of first photodiodes coupled to the first floating diffusion region 56a is higher than the number of second photodiodes coupled to the second floating diffusion region 56b, the array 50 can be used to detect two signals, one of which requires a detector with a higher sensitivity than the other one.

According to an example, the detector can include a light source (not shown) configured to emit a first light pulse, for long range object detection, and second light pulse for short range object detection. For example, detector can be a LiDAR detector, configured to emit a first laser pulse for detecting objects at a range of 10 m-300 m, and to further emit a second laser pulse for detecting objects at a range of 10 cm-10 m. since the first laser pulse is subject to higher interference and attenuation, the detector can include array 50 of FIG. 5, and can be configured such that the first photodiodes 54a, 54b and 54c are configured to detect reflecting pulse of the first laser pulse, while the second photodiode 54d is configured to detect reflecting pulse of the second laser pulse.

It is appreciated that for detecting long range objects, by utilizing Time Of Flights (TOF) techniques, the distance to the object is calculated in accordance with the portion of the pulse which is detected within the time frame of the pulse. I.e. the amount of light of the pulse which is detected is proportionate to the time of flight of the pulse to the object and back to the detector. Accordingly, for long distance objects, a relatively large pulse is utilized, i.e. a pulse having a length which is larger than the time of flight of the pulse to and from the object. This is in comparison with short distance objects in which a much shorter pulse can be used and hence more pulses per seconds. Accordingly, the consequences of using a larger pulse is a lower number of pulses per second and thus a reduced accuracy.

Furthermore, when calculating distance between an object and the detector the following equation can be utilized:

$$D = \frac{1}{2} c \, t_0 \frac{S_2}{S_1 + S_2}.$$

Where c is the speed of light; $t_0$ is the time the pulse takes to travel to the target and back; $S_1$ is the amount of the light pulse that is received; and $S_2$ is the amount of the light pulse that is blocked. i.e. the back portion of the pulse. Thus, when utilizing long pulses, the entire amount of light of the pulse is represented by $S_1+S_2$, is much larger than the portion of the light $S_1$ which is received at the detector. Consequently, the ratio between the total amount of light and the light which is detected yields a relatively small number and affects the accuracy of the detection.

In addition, since the first laser pulse has a much higher divergence and the beam scatters at a higher rate, detection of the portion of the pulse reflected from distanced objects requires a higher sensitivity. Accordingly, the detector of the presently disclosed subject matter provides an array in 50 which, each pixel 52 has three first photodiodes 54*a* for detecting long range signals requiring high sensitivity and a single second photodiode 54*b* for detecting a short range signal requiring relatively low sensitivity. This way, each pixel can detect light reflected from objects disposed at a short and long range with respect to the detector.

According to the illustrated example, the photodiodes 54 are arranged in two rows 60*a* and 60*b*, thus the three first photodiodes 54*a*, 54*b* and 54*c* can be arranged such that two of the first photodiodes 54*b* and 54*c* are disposed on the second row 60*b* and one of the first photodiodes 54*a* is disposed on the first row 60*a*. This way, each of the pixel sensors 52 is disposed on two columns of the array, i.e. the array does not have to be enlarged along the first dimension 58*a* and the resolution along the first dimension of the array is not compromised.

It is appreciated that readout of the three first photodiodes 54*a*, 54*b* and 54*c* via the first floating diffusion region 56*a* can be carried with binning technology.

According to an example, in case the detector is used for detection of objects ahead of an autonomous vehicle, the detector can be utilized with a controller implementing superimposition techniques, i.e. by first detecting objects at a short range by sending a light pulse for short range detection, and if no object is detected, the detector sends a light pulse for long range detection, such that light reflected from distanced objects can be detected.

According to another example, the array can include a single row increased along the first dimension of the array such that each pixel has three photodiodes. According to this example, two first photodiodes in each pixel are coupled to a first floating diffusion region and one second photodiode, out of the three photodiodes in each pixel, is coupled to a second floating diffusion region. This way, the two first photodiodes provide higher sensitivity, and can be used to detect weaker signals, such as a long-range object detection, while the one second photodiodes provide a relatively lower sensitivity, and can be used to detect stronger signals, such as a short-range object detection.

According to a further example, the array can include a plurality of pixels each having one or more photodiodes and a floating diffusion region coupled thereto. According to this example each pixel includes only one floating diffusion region, the detector is however configured to alternately detect signals of the long range and signals of the short range. That is to say, in order to independently obtain information on two signals, such as a long-range signal and a sort-range signal the array can be used in conjunction with a light source and a controller configured to selectively initiate detection of one of the two or more signals.

According to this example the detector can be utilized in a Light Detection and Ranging systems (LiDAR) and including a light source configured to alternately emit a first light pulse for a long-range object detection and a second light pulse for a short-range object detection. When either one of the long-range and short-range light pulses impinges on an object the light reflected by the object is detected by the pixel array. The controller is then configured to determine the range of the object as described hereinabove with respect to FIG. 4, taking into consideration the light detected when the short-range pulse is sent and the light detected when the short-range pulse.

According to an example, the alternation between the long-range pulse and the short-range pulse is predetermined in accordance with the detection and accuracy requirements, such as a series of two long-range pulses followed by one short-range pulse, increasing thereby the accuracy of the long-range detection. According to an example, the alternation between the long-range pulse and the short-range pulse is dynamic, i.e. the controller of the detector is configured to determine what range requires higher accuracy and thus sends more pulses for the required range. For example, if an object is detected in the long range, and more data is required to determine the accurate distance of the object, the detector can be configured to send more long-range pulses so as to better asses the distance or the kind of object.

Alternatively, the controller can be configured to send short-range pulses, and in case the reflection received by the detector indicates that no object is located in the short-range the controller is configured to send a long-range pulse and to determine if an object is located in the long range with respect to the LiDAR system.

According to this example, the readout time of the floating diffusion region is synchronized with the pulsing time of the light source. This way, the photodiodes of each pixel can detect long-range objects during the time slot of the long-range pulse, and detect short-range objects during the time slot of the short-range pulse. Since each pixel includes two photodiodes, the sensitivity of the array conforms with the requirements of the long-range detection.

Figure 6:
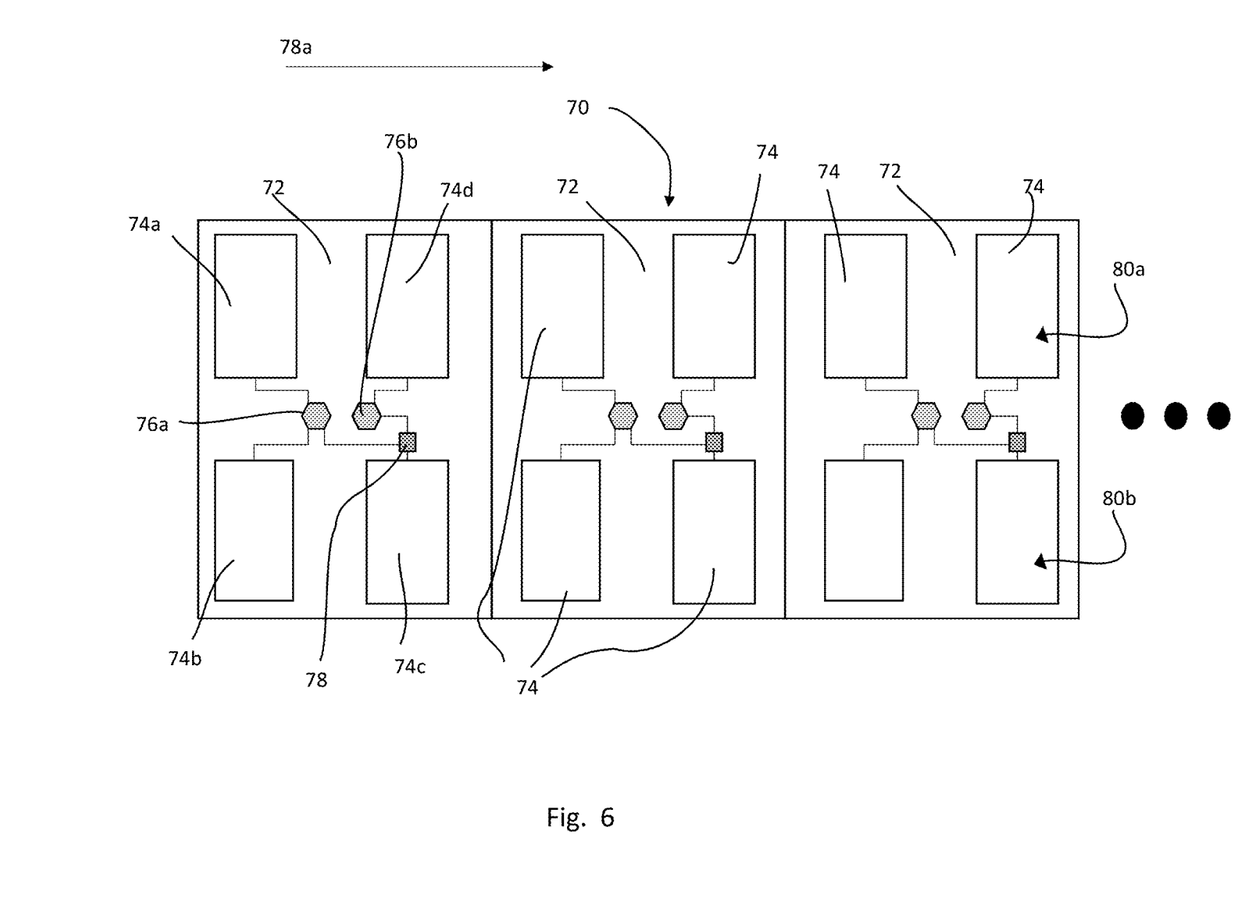
FIG. 6 is a schematic illustration of an array of pixel sensors constructed and operative in accordance with another example of the presently disclosed subject matter.

Reference is now made to FIG. 6, which illustrates an array 70 of pixel sensors generally designated 72, substantially similar to that of FIG. 5, arranged along a first dimension and configured with high resolution along the first dimension. The array 70, which includes two rows 80*a* and 80*b* of photodiodes 74, such that each pixel sensor 72 includes four photodiodes 74*a*, 74*b*, 74*c* and 74*d*, as the pixel sensors 52 of FIG. 5. As in the array 50 of FIG. 5, each of the pixel sensors 72 includes a first floating diffusion region 76*a* and a second floating diffusion region 76*b*. The first floating diffusion region 76*a* is coupled to three first photodiode 74*a*, 74*b*, 74*c* and is configured for readout of the charges therein. The second floating diffusion region 76*b* is coupled to the second photodiode 74*d*. Contrary to the pixel sensors 52 of FIG. 5, according to the present example the second floating diffusion region 76*b* is coupled also to one of the first photodiode, here illustrated as first photodiode 74*c* via a switching or gating element 78.

According to this example, two first photodiodes 74*a* and 74*b* are permanently coupled to the first floating diffusion region 76*a*, one second photodiodes 74*d* is permanently coupled to the second floating diffusion region 76*b*. The first photodiode 74*c*, which can be defined as a selectable photodiode, is selectively coupled to either the first or the second floating diffusion regions 76*a* and 76*b*. This way, the pixel sensors 72 can be utilized to detect two different signals by using either even number of photodiodes 74 for each signal or increasing the number of photodiodes 74 for detecting a first signal and respectively reducing the number of photodiodes 74 for detecting a second signal.

In other words, in a first position, a first signal can be detected by three first photodiodes 74*a*, 74*b* and 74*c*, and the second signal can be detected with one second photodiode 74*d*. In this position, the gating element 78 is configured such that the first photodiodes 74*c* is coupled to the first floating diffusion region 76*a*.

In a second position, on the other hand, a first signal can be detected by two first photodiodes 74*a* and 74*b*, and the second signal can be detected with two second photodiode 74*c* and 74*d*. In this position, the gating element 78 is configured such that the first photodiodes 74c is coupled to the second floating diffusion region 76b.

This way, the sensitivity of the detection of the first signal can be increased on the account the sensitivity of the detection of the second signal.

It is appreciated that the switching or gating element 78 can be programmed such that the detection of the signals can be carried out with different sensitivities. According to an example, the detector can be configured to automatically increase the sensitivity of detection of one of the signals in response to predetermined conditions, such as ambient light, or low reflection of light, etc. According to another example, the detector can be configured to alternate between detection of the two signals with equal sensitivity, i.e. each signal is detected by two photodiodes 74, and detection of one of the signal with higher sensitivity i.e. one signal is detected by three photodiodes 74 while the other signal is detected by one photodiodes 74. This way, data regarding objects in front of the detector can be obtain in various sensitivities.

According to an example, in case the detector is used for detection of objects ahead of an autonomous vehicle, the detector can be utilized with a superposition technique. I.e. first detecting objects at a short range by sending a light pulse for short range detection, and utilizing the pixel sensors 72 to detect the reflected light in accordance with the second position, in which one second photodiode 74d and one first photodiode 74c are configured to detect the reflected light. If no object was detected the detector sends a second light pulse, this time for long range detection, and the pixel sensors 72 is utilized to detect the reflected light in accordance with the first position, in which first photodiode 74c is configured to detect the reflected light together with the other first photodiode 74a and 74b.

It is appreciated that the above described array arrangement can be combined with other pixel array arrangements, such as described in the international patent application WO/2018/096546 which is incorporated herein by reference. That is to say the resolution of the array can be further increased by utilizing a two dimensional array having pixels disposed in a first row, a second row, a third row, and a fourth row.

The pixels which includes four photodiodes, are alternately disposed on either the first and second rows, or on the third and fourth rows, an a partially overlapping arrangement. As described above each of the pixels can include a first and a second floating diffusion regions and three photodiodes are coupled to the first floating diffusion region, while the forth photodiode is coupled to the second floating diffusion region.

This way, the array provides a high resolution for each pixel, and varying sensitivities for detecting either short range light pulses or a long range light pulses.

Those skilled in the art to which the presently disclosed subject matter pertains will readily appreciate that numerous changes, variations, and modifications can be made without departing from the scope of the invention, mutatis mutandis.

The invention claimed is:

1. A range detector for detecting distance of an object comprising:
a light source configured to emit a first light pulse and a second light pulse towards a distant object, said first light pulse being configured for short-range object detection and said second light pulse being configured for long-range object detection;
an active pixel sensor having a plurality of pixel elements each of which including at least one photodiode and at least one floating diffusion region configured to receive photoelectric charge from said at least one photodiode, said at least one photodiode being disposed with respect to said light source, such that said first and second pulses are reflected back from the object towards the at least one photodiode; and
a controller configured to actuate said light source to selectively emit said first and second light pulses and to determine distance between the object and the active pixel sensor in accordance with photoelectric charge received from said photodiode in response to said first and second light pulses.

2. The range detector of claim 1 wherein said controller is configured to select between said first and second light pulses in accordance with detection and accuracy requirements.

3. The range detector of claim 1 wherein said controller is configured to alternately select between said first and second light pulses in predetermined pattern.

4. The range detector of claim 1 wherein said controller is configured to assess results of detection of an initial light pulse and to determine successive pulse by selecting between said first and second light pulses in accordance with said results.

5. The range detector of claim 4 wherein said initial light pulse is a short-range pulse and wherein said controller is configured to select said second light pulse wherein said results indicate that no object is located in said short-range.

6. The range detector of claim 1 wherein readout time of the floating diffusion region is synchronized with a time duration of one of said first and second light pulses such that said photodiode detects short-range objects during time duration of said first pulse and detects long-range objects during time duration of said second pulse.

7. The range detector of claim 1 wherein said photodiode includes at least one first photodiode and at least one second photodiode and wherein said at least one floating diffusion region includes a first floating diffusion region configured to receive photoelectric charge from said first photodiode and a second floating diffusion region configured to receive photoelectric charge from said second photodiode.

8. The range detector of claim 7 wherein said controller is configured to determine distance of a long-range object in accordance with photoelectric charge received from said first photodiode in response to said first light pulse and to determine distance of a short-range object in accordance with photoelectric charge received from said second photodiode in response to said second light pulse.

9. The range detector of claim 7 wherein each said at least one first photodiode includes at least two first photodiodes configured for readout by sad first floating diffusion region, and wherein said at least one second photodiode includes one second photodiode, such that an amount of charges received in said at least two first photodiodes is larger than an amount of charges received in said second photodiode.

10. An array of pixel elements arranged in columns along a first dimension of the array, each of the pixel elements comprises:
at least one first photodiode and at least one second photodiode, said first and second photodiodes having an active area for receiving light radiation;
a first floating diffusion region configured to receive photoelectric charge generated in the active area of said first photodiode and a second floating diffusion region configured to receive photoelectric charge generated in the active area of said second photodiode;
wherein active area of said second photodiode is larger than active area of said first photodiode.

11. The array of pixel elements of claim 10 wherein said at least one first photodiode includes at least two photodiodes and wherein said at least one second photodiode includes one second photodiode.

12. The array of pixel elements of claim 10 wherein the array includes at least a first row and a second row of photodiodes and wherein at least one first photodiode includes one first photodiode disposed on said first row and two first photodiodes disposed on said second row, and wherein said at least one second photodiode includes one second photodiode disposed on said first row.

13. The array of pixel elements of claim 12 wherein the total active area of said first photodiodes is larger than the active area of said one second photodiode, such that sensitivity of each pixel with respect to light detected by said first photodiode is higher than sensitivity of same pixel with respect to light detected by said second photodiode.

14. The array of pixel elements of claim 10 wherein said first floating diffusion region is configured for readout of said first photodiode at a first frequency and wherein said second floating diffusion region is configured for readout of said second photodiode at a second frequency, and wherein said first and second frequencies are configured such that said first photodiode detects a first light signal and said second photodiode detects a second light signal.

15. The array of pixel elements of claim 11 wherein said second photodiode is coupled to said second floating diffusion region and wherein said two photodiodes includes a selectable photodiode which is selectively coupled to said first floating diffusion region and second floating diffusion region.

16. The array of pixel elements of claim 15 wherein said selectable photodiode includes a switching element for selecting between said first and second floating diffusion regions.

17. The array of pixel elements of claim 16 further comprising a controller for controlling said switching elements, wherein said controller is configured to configure said switching elements to couple said selectable photodiode to said second floating diffusion region in response to a low readout of said second floating diffusion region increasing thereby an active area of photodiodes coupled to said second floating diffusion region.

* * * * *